Patented May 10, 1938

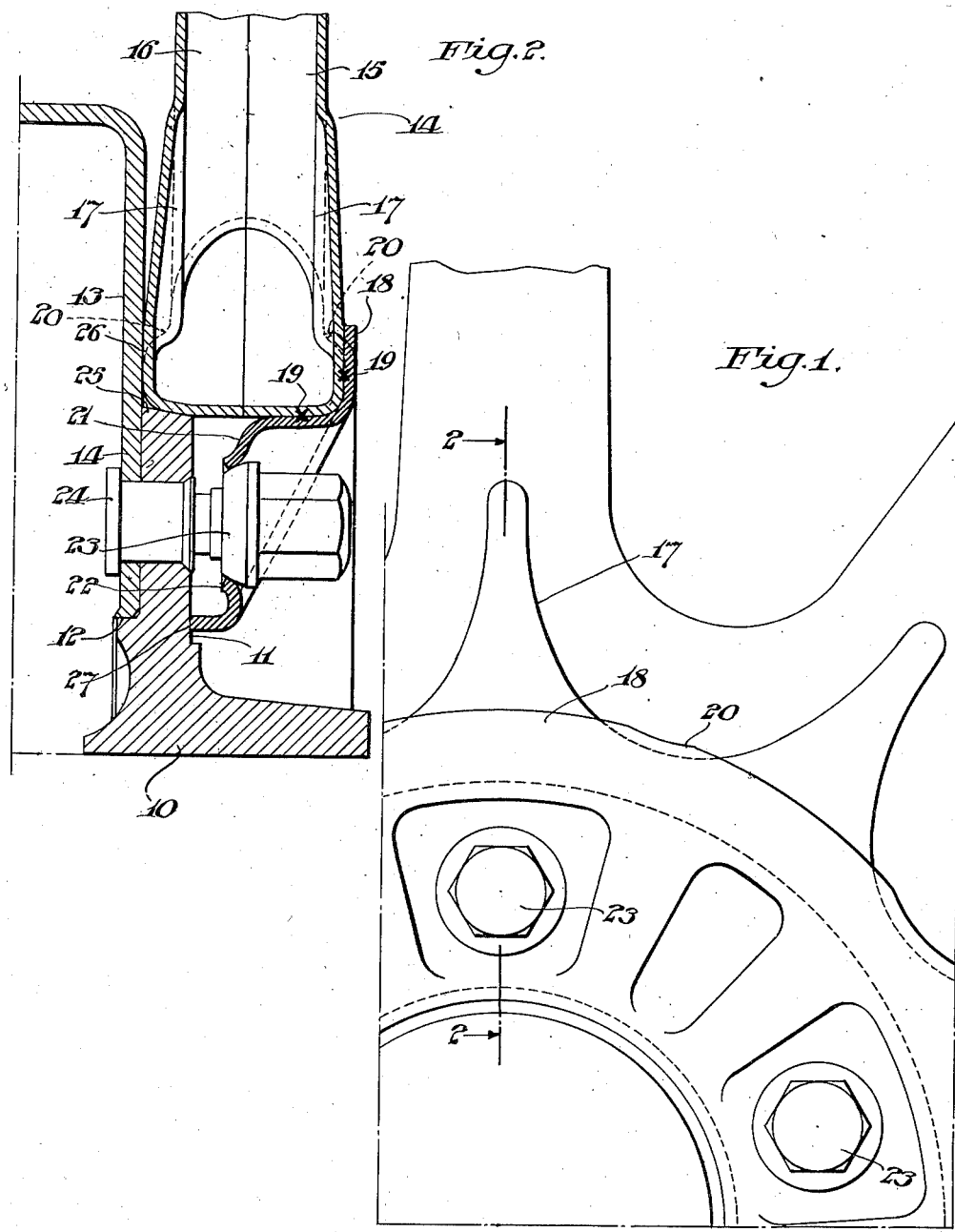

2,116,599

UNITED STATES PATENT OFFICE 2,116,599

ARTILLERY WHEEL

Carolus L. Eksergian and Paul W. Gaenssle, Detroit, Mich., assignors to Budd Wheel Company, Philadelphia, Pa., a corporation of Pennsylvania Application May 31, 1930, Serial No. 458,321

4 Claims. (Cl. 301—9)

The purpose of our invention is to form an inexpensive wheel with a simple and adequate means for securing the wheel to its hub.

It has been a particular object of our invention to form the wheel body of a minimum quantity of material and at the same time to produce a wheel having a stronger portion adjacent the circle which is adapted to receive the securing means than those heretofore known.

While we have illustrated our invention in connection with an artillery steel wheel and intend it primarily for use in that connection, it might also be used in connection with other types of wheel, and we do not, therefore, wish to be limited to a steel wheel. In the particular embodiment shown in the drawing, we have achieved the purposes of our invention by foreshortening the nave portion of the wheel and clamping this portion to a flange formed integrally with the hub by means of an annular clamp having seats to receive the securing means.

In the drawing,

Fig. 1 illustrates a side elevation of such a wheel, and

Fig. 2 is a sectional view along the line 2—2 of Fig. 1.

Referring to the drawing by reference characters, 10 indicates a vehicle hub of conventional design having a flange 11 extending radially therefrom. This flange is provided with a shoulder 12 upon which a brake drum 13 is adapted to seat. This brake drum is secured to the flange by the same securing bolts 24 which hold the wheel proper in place, these securing bolts being provided with offset portions to hold the clamp. The wheel proper 14 consists of integral nave and spoke portions and is preferably formed of two identical halves 15 and 16 secured together by welding. The wheel is ribbed longitudinally as shown at 17. An annular clamp 18 serves to hold the wheel in place and is preferably welded to the outer half of the wheel as indicated at 19.

In the process of forming the wheel, the clamp 18 should be welded to the outer half of the wheel body before the two halves of the wheel are united to each other. This feature is of importance because access to the interior of the wheel for the purpose of welding these parts together is very difficult to obtain after the halves of the wheel are once welded to each other. The clamp 18 has portions of its periphery turned inwardly into the depressions between the ribs 17 as indicated at 20. The inner radial portion of this clamp is inturned, as indicated at 21, to form a bolt receiving seat, the coined bolt holes being indicated at 22. A series of ball-faced nuts 23 secure the clamp and wheel in place. The foreshortened nave portion of the wheel has a radial seat against the outer periphery of the hub flange 11 at 25, and an axial seat against the brake drum as indicated at 26, the clamp seating against the hub flange in an inner zone at 27.

The advantages of our wheel are self-evident. The wheel is considerably cheaper than those of the prior art by reasons of the fact that the nave is foreshortened and a very considerably smaller amount of metal is therefore necessary in the making of the main body of the wheel. The wheel is strong by reason of the ribbing and by reason of its very rigid connection with the hub and brake drum through the clamping means disclosed. The clamp is provided with an inturned inner peripheral margin 27, and this margin acts as a fulcrum about which the outer peripheral portions of the clamp tend to clamp the wheel body to the hub flange and brake drum when the nuts 23 are screwed home. This constitutes a very simple and effective clamping means for the wheel of superior rigidity and strength. The outer peripheral margin 25 of the hub flange forms a slight angle with respect to the axis of the wheel in order to constitute a very firm bearing seat for the nave portion of the wheel when forced by the securing means to ride upwardly on this flange. The inturned portions 20 of the clamp constitute, together with the spot welded portions 19, a secure driving means for the nave of the wheel proper. It will be apparent to those skilled in the art that our invention has certain features which are applicable to other than artillery steel wheels, and we do not, therefore, wish to be limited to such applications.

We wish the term "bolt circle" as used in the subjoined claims to be interpreted to mean the perimeter of the figure formed by joining the members of any series of securing means which secure a hub to a wheel to clamp these parts together, whether or not such securing means constitute bolts or are circularly arranged.

It will be obvious to those skilled in the art that our invention is subject to various modifications, and we therefore wish our claims to be read in the light of the generic spirit of the invention rather than in a strict and literal sense.

What we claim is:

1. A vehicle wheel comprising, in combination, a hub, a hollow spoked metal wheel body, and a clamp adapted to secure said wheel body to said hub, said clamp comprising a single stamping, said clamp having inturned portions which provide seats for the securing means and radial seats for the wheel body.

2. A vehicle wheel comprising in combination, a hollow spoked metal wheel body, said wheel body having substantially spider-shaped ribbing including ribs extending radially of the spokes and merging into a rib annularly continuous about the inner nave periphery, and a clamp arranged for securing said wheel body to a hub, said clamp having inturned portions to provide seats for said wheel body, and being peripherally corrugated complementally to the rib portions of said wheel body between consecutive spokes.

3. A vehicle wheel comprising in combination, a hollow spoked metal wheel body, said wheel body having substantially spider-shaped ribbing including ribs extending radially of the spokes and merging into a rib annularly continuous about the inner nave periphery, the radial portions of said ribs being of increasing dimension annularly progressively radially inwardly thereof, and a clamp arranged for securing said wheel body to a hub, said clamp having inturned portions to provide seats for said wheel body, and being peripherally corrugated complementally to the rib portions of said wheel body between consecutive spokes.

4. A stamped sheet metal artillery wheel of the hub demountable bolt on type comprising a main body having a rear main load supporting stamping having a nave and spokes radiating therefrom, a complemental stamping likewise comprising a nave and radiating spokes, the spokes of said stampings joined at their sides from end to end and combined in the body to produce hollow spokes, and a bolting-on flange integrally connected to one of said stampings and axially offset to lie within the wheel body and adjacent the medial plane of the wheel.

CAROLUS L. EKSERGIAN.
PAUL W. GAENSSLE.